United States Patent
Choi et al.

(10) Patent No.: US 7,167,732 B2
(45) Date of Patent: Jan. 23, 2007

(54) METHOD FOR ENHANCED POWER SAVING ON DCF BASED WIRELESS NETWORKS

(75) Inventors: Jong Mu Choi, Gunpo (KR); Jai Hoon Kim, Yongin (KR); Young Bae Ko, Gunpo (KR)

(73) Assignee: AJOU University Industry Cooperation Foundation, Suwon-si (KR)

( * ) Notice: Subject to any disclaimer, the term of this patent is extended or adjusted under 35 U.S.C. 154(b) by 192 days.

(21) Appl. No.: 10/667,929

(22) Filed: Sep. 22, 2003

(65) Prior Publication Data

US 2004/0228293 A1 Nov. 18, 2004

(30) Foreign Application Priority Data

May 12, 2003 (KR) ...................... 10-2003-0029936

(51) Int. Cl.
*H04B 11/38* (2006.01)
(52) U.S. Cl. .................. 455/574; 455/522; 455/343.4; 340/7.32; 340/7.36; 340/7.33; 370/311; 370/338
(58) Field of Classification Search ................ 455/574, 455/343, 522, 343.4; 370/388, 311, 338; 340/7.36, 7.33, 7.32
See application file for complete search history.

(56) References Cited

U.S. PATENT DOCUMENTS 6,192,230 B1 * 2/2001 van Bokhorst et al. .. 455/343.3

OTHER PUBLICATIONS

Power-Saving Mechanisms in Emerging Standards for Wireless LANs: The MAC Level Perspective, Hagen Woesner et al., IEEE Personal Communications, Jun. 1998, p. 43.*

* cited by examiner

*Primary Examiner*—Lester G. Kincaid
*Assistant Examiner*—Dung Lam
(74) *Attorney, Agent, or Firm*—Ober / Kaler; Royal W. Craig

(57) ABSTRACT

A method for enhanced power saving on DCF based wireless networks is disclosed. The method divides a beacon transmitting section in an Announcement Traffic Indication Message (hereinafter, referred to as "ATIM") window period defined by IEEE standard 802.11 according as there is a data packet to be sent or not and allows a terminal that has received the beacon to go to a doze state immediately according to beacon reception timing, thereby preventing unnecessary power consumption.

2 Claims, 4 Drawing Sheets

FIG. 5 (Amended)
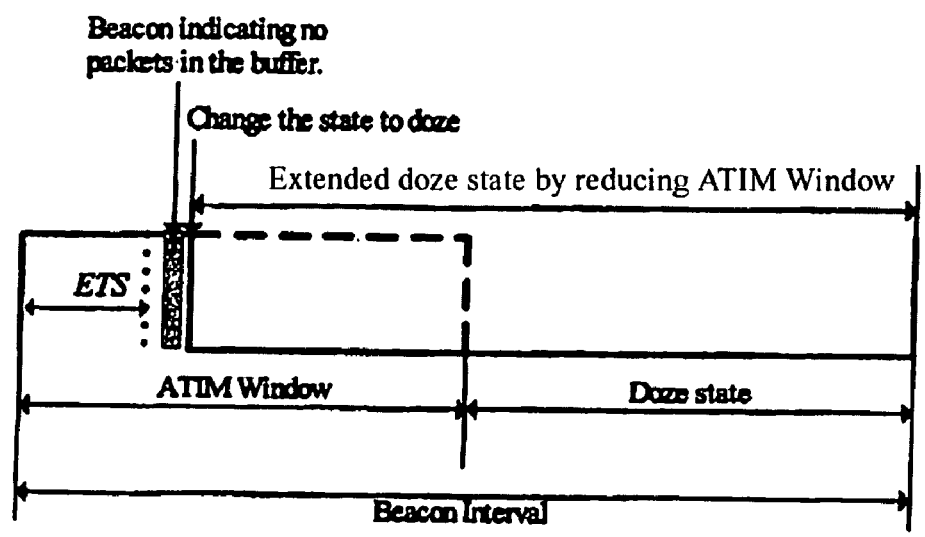

METHOD FOR ENHANCED POWER SAVING ON DCF BASED WIRELESS NETWORKS

CROSS-REFERENCE TO RELATED FOR APPLICATIONS

Pursuant to 35 U.S.C. 119(a) the present application derives priority from the following foreign filed patent application: Korean Patent Application No. 2003-29936, filed May 12, 2003.

BACKGROUND OF THE INVENTION

1. Field of the Invention

The present invention relates to a method for enhanced power saving on Distributed Coordinated Function (DCF) based wireless networks. Specifically, the invention relates to a method which divides a beacon transmitting section in an Announcement Traffic Indication Message (ATIM) window period, defined by IEEE standard 802.11, according that there is a data packet to be sent or not and allows a terminal that has received the beacon to go to a doze state immediately according to beacon reception timing, thereby preventing unnecessary power consumption.

2. Description of the Background

A power saving mechanism in DCF, defined in IEEE 802.11, will be explained hereinafter with reference to FIG. 1.

A basic approach for saving energy in IEEE standard 802.11 is to periodically convert the state of a radio terminal to a doze mode. The radio terminal being in the doze state changes its state to an awake state in order to receive a beacon or Traffic Indication Map (TIM) or transmit MAC Service Data Unit (MSDU). To periodically change the states of radio terminals, synchronization must be carried out for all of the radio terminals. In a Point Coordinated Function (PCF) mode, Point Coordinator (PC) as an operator performs global synchronization. In DCF, however, all of radio terminals carry out synchronization through beacon because there is no global synchronization operator in DCF.

That is, beacons are generated in such a manner that they are distributed in all of radio terminals of a network in DCF. Each radio terminal has its timing synchronization function (TSF) timer in order to synchronize with a beacon cycle. Furthermore, each beacon includes its time stamp. All the radio terminals that have packets to be send during a beacon interval transmit their beacons using standard back-off algorithm.

In the case where multiple radio terminals transmit their beacons within one beacon interval, the beacon of the radio terminal that has sent it for the first time is selected and the other beacons sent by the remaining radio terminals are cancelled. In FIG. 1, for example, the beacon of node A is selected and beacons of the remaining radio terminals are cancelled. When a specific beacon is selected, all of other radio terminals adjust their timer to timestamp of the selected beacon so that all of the radio terminals can accomplish synchronization. At this time, beacon transmission is carried out in an awake-period of the beacon interval.

In the meantime, as shown in FIG. 2, IEEE standard 802.11 defines an ATIM window as a period during which radio terminals are awake in the beacon interval. During the ATIM window period, all the radio terminals can exchange beacons and ATIM/ACK packets with one another. All of the radio terminals must be converted into the awake state during the ATIM window period in order to achieve synchronization and to receive packet transmission announcements.

A packet transmission announcement is made through an ATIM packet. When a radio terminal A (node A) has a data packet to send to a radio terminal B (node B), the radio terminal A stores the data packet in a buffer and performs synchronization through beacon, and then transmits the ATIM packet to the terminal B. The terminal B receives the ATIM packet sends an ACK packet in answer to the ATIM packet. The radio terminal B, which has exchanged the ATIM packet and ACK packet with the radio terminal A, during the ATIM window period, does not change its state to the doze state after the ATIM window period but carries out data communication while exchanging the data packet and ACK signal with the radio terminal A. Other radio terminal C (node C), is converted to the doze when the ATIM window is finished.

As described above, in a Power Saving Mode (PSM) of IEEE standard 802.11, each radio terminal has ATIM window period with a fixed length and a doze period. However, this has several inefficient factors in terms of energy use. Firstly, even in the case where there is no traffic on a network, radio terminals are converted into the awake state and consume energy during the ATIM window period because the length of the ATIM window period is fixed. Secondly, in an IEEE standard 802.11 PSM technique, corresponding radio terminals should be awake until the beacon interval is finished even after data transmission is completed, resulting in unnecessary waste of energy.

SUMMARY OF THE INVENTION

Accordingly, the present invention has been proposed in view of the above problems. An object of the present invention is to provide a method which divides a beacon transmitting section in an ATIM window period, defined by IEEE 802.11, according to whether there is a data packet to be sent or not and allows a terminal that has received the beacon to go to a doze state immediately according to beacon reception timing, thereby preventing unnecessary power consumption.

To accomplish the above object, according to the present invention, there is provided a method for reducing the power consumption of terminals communicating with each other using a beacon interval divided into an Announcement Traffic Indication Message (ATIM) window period and a doze state period, according to IEEE standard 802.11 on Distributed Coordinated Function (DCF) based wireless networks, the method comprising the steps of:

(1) dividing an ATIM window period into an Earlier Time Slot (ETS) section and a Later Time Slot (LTS) section which are distinguished from each other;

(2) when a certain terminal has a data packet to be sent to another terminal, transmitting beacon to each terminal during the ETS section, and when the terminal has no data packet, transmitting the beacon to each terminal during the LTS section; and, (3) when a terminal has received the beacon during the LTS section, allowing it to immediately change its state to the doze state but not to wait for the doze state period.

BRIEF DESCRIPTION OF THE DRAWINGS

The above and other objects, features and advantages of the present invention will become more apparent from the following detailed description of the preferred embodiments and certain modifications thereof when considered in conjunction with the accompanying drawings, in which:

FIG. 5 illustrates the reduction of ATIM window period according to the present invention.

DETAILED DESCRIPTION OF THE PREFERRED EMBODIMENTS

Reference will now be made in detail to the preferred embodiments of the present invention, examples of which are illustrated in the accompanying drawings.

Figure 1:
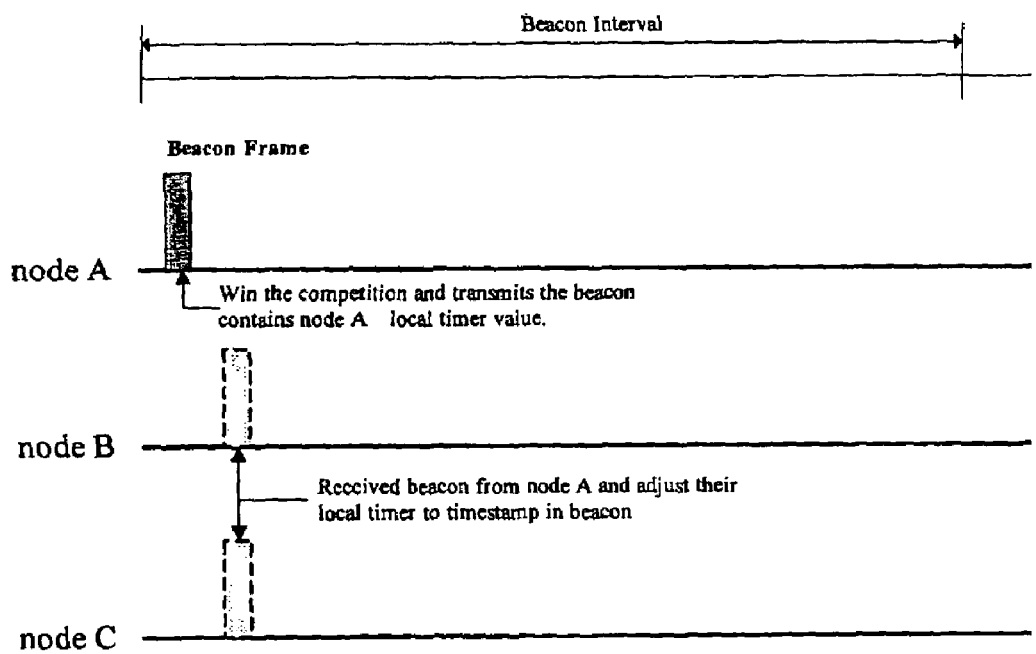
FIG. 1 illustrates the outline of transmission of beacon in IEEE 802.11 DCF.
Figure 2:
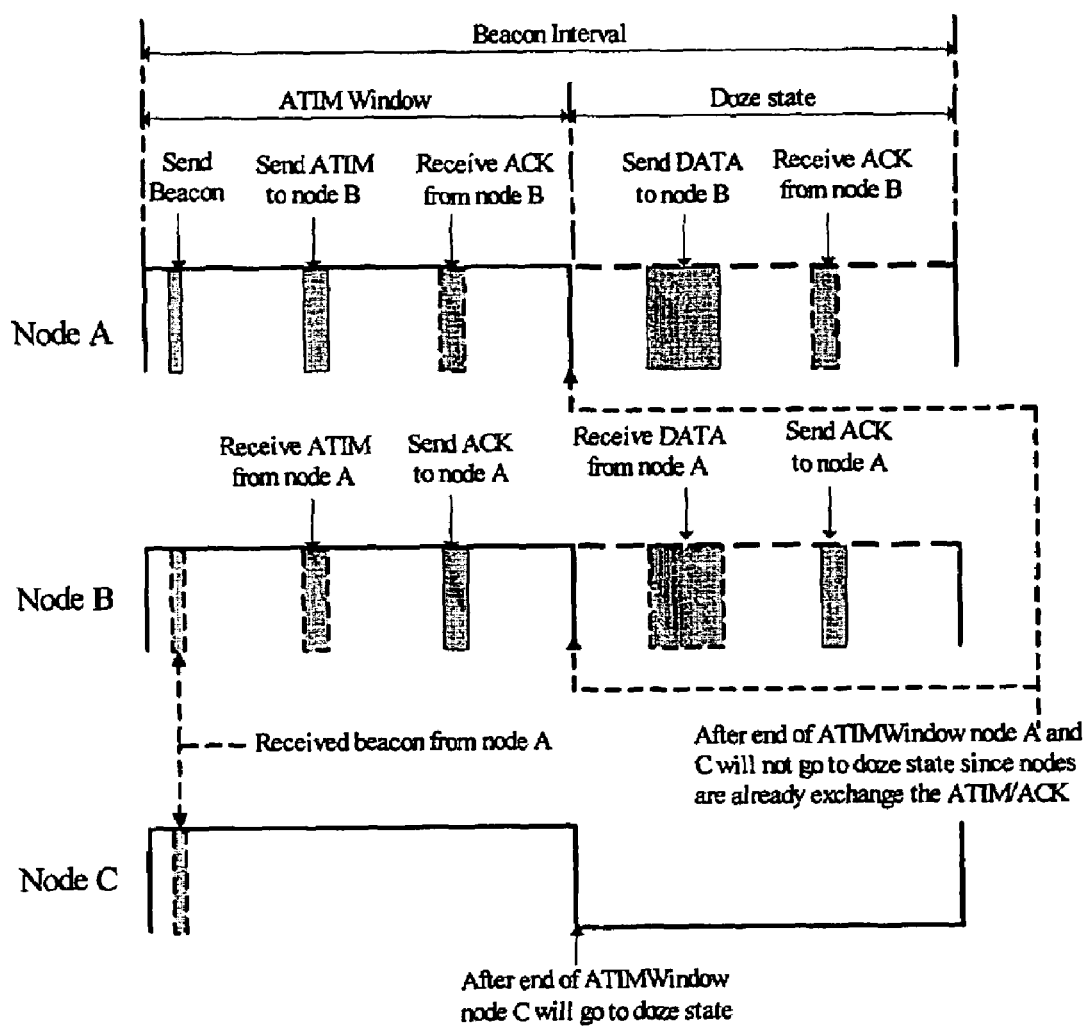
FIG. 2 illustrates the outline of ATIM window and ATIM packet.
Figure 3:
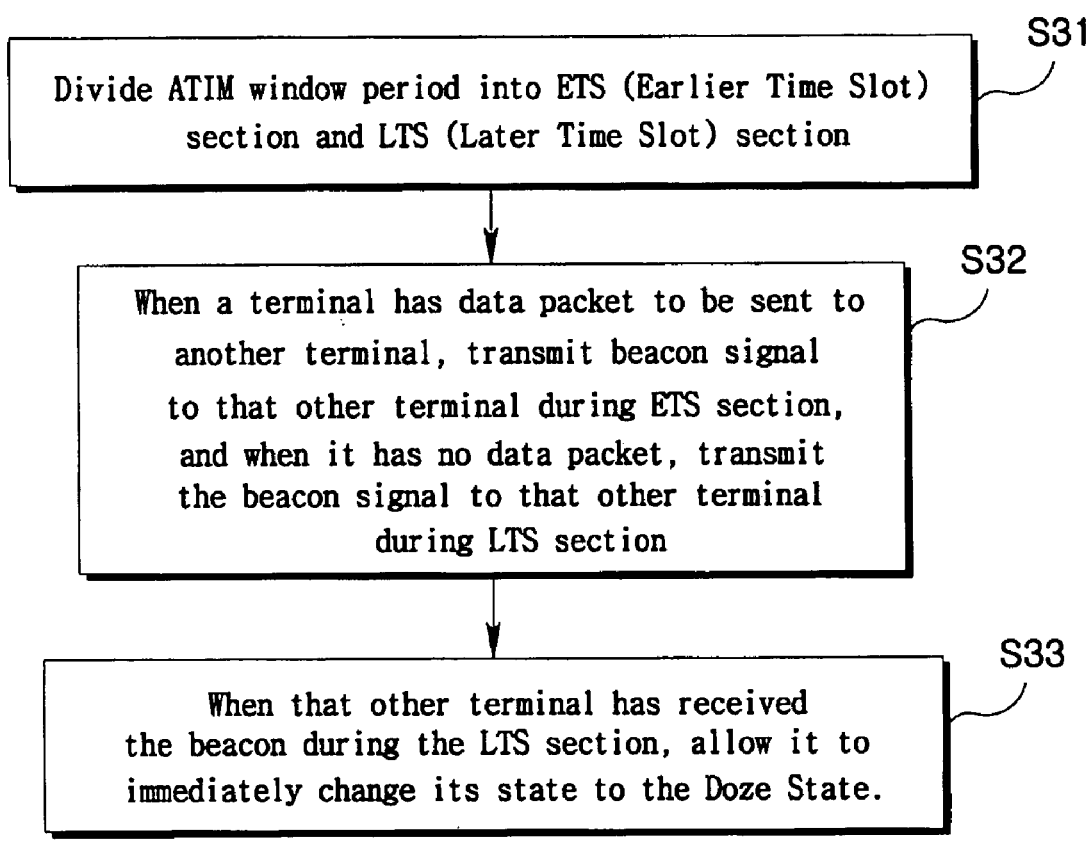
FIG. 3 is a flow chart showing a method for enhanced power saving on DCF based wireless networks according to the present invention.
Figure 4:
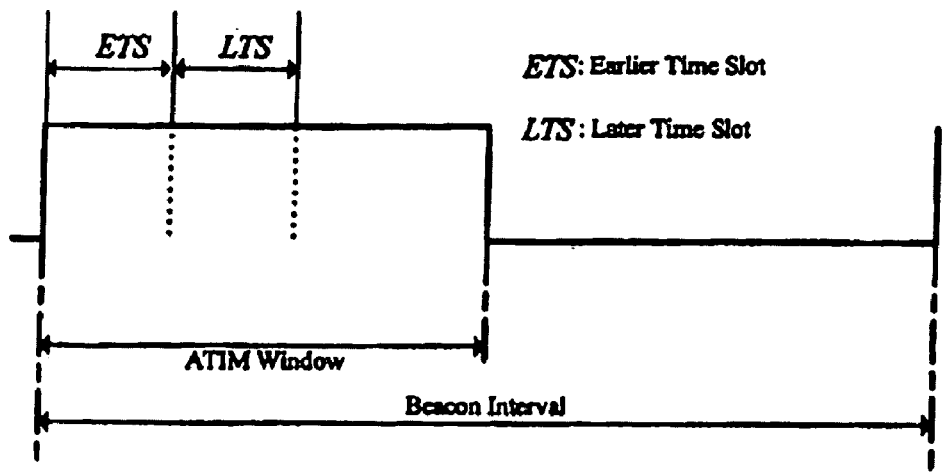
FIG. 4 illustrates the outline of division of ATIM window according to the present invention.

Referring to FIG. 3, the method for enhanced power saving on DCF based wireless networks according to the present invention judges whether or not each terminal currently has a data packet to be sent during one of two beacon signal transmission time slot sections. For this purpose, as shown in FIG. 4, an ATIM window period constituting a beacon interval is divided into an ETS section and an LTS section, distinguished from each other, at the step S31.

When a certain terminal has a data packet to be sent to another terminal, it transmits a beacon signal to the each terminal during the ETS section. When the certain terminal has no data packet to be sent to another terminal, it transmits the beacon to each other terminal during the LTS section, at the step S32. That is, each radio terminal sends a beacon signal during the ETS section when it stores the data packet in the buffer, but transmits the beacon signal during the LTS section when there is stored no data packet in the buffer.

When a terminal has received a beacon signal during LTS section, it does not wait for the doze state period but immediately changes its state to the doze state, at the step S33.

Referring to FIG. 5, the terminal that has received the beacon signal recognizes that there is no data packet to be transmitted and received because the beacon has been received during the LTS section, so that the terminal's state is converted into the doze state immediately Accordingly, the ATIM window length is automatically reduced for energy saving when there is no traffic to be transmitted on networks. Thus, terminals need not be in the awake state until ATIM window period is finished although they have no data packets to be sent and received, so that power saving can be achieved. At this time, although the ETS and LTS sections can be arbitrarily established, it is preferable that they are set to maximum back-off time (aMaxCW) defined by IEEE standard 802.11.

According to the present invention, one terminal that has received beacon on DCF based wireless networks immediately goes to the doze state when it has no data packet to be sent to and received from the other terminal, so that power consumed by the terminal can be saved.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

We claim:

1. A method for reducing consumption power of terminals communicating with each other using a beacon interval divided into an Announcement Traffic Indication Message (ATIM) window period and a doze state period [according to IEEE standard 802.11] on Distributed Coordinated Function (DCF) based wireless networks, the method comprising the steps of:

(a) dividing an ATIM window period into an Earlier Time Slot (ETS) section and a Later Time Slot (LTS) section which are distinguished from each other;

(b) when a certain terminal has a data packet to be sent to another terminal, transmitting a beacon to each terminal during the ETS section, and when the terminal has no data packet to be sent to that other terminal, transmitting the beacon to each terminal during the LTS section; and (c) when a terminal has received the beacon during the LTS section, allowing it to immediately change its state to the doze state without waiting for the doze state period.

2. The method as claimed in claim 1, wherein the ETS and LTS sections are maximum back-off time [defined by IEEE standard 802.11].

* * * * *